United States Patent [19]
Chu

[11] Patent Number: 5,328,350
[45] Date of Patent: Jul. 12, 1994

[54] THERMOPLASTICS MOLDING AND FORM SETTING DEVICE

[76] Inventor: Chen-Kuo Chu, No. 65,Lane 921,San Feng Rd., Feng Yuan, Taichung Hsien, Taiwan

[21] Appl. No.: 8,348

[22] Filed: Jan. 22, 1993

[51] Int. Cl.⁵ .................. B29C 43/04; B29C 33/34
[52] U.S. Cl. ............................ 425/451; 249/120; 249/126; 425/453; 425/454; 425/DIG. 201
[58] Field of Search .............. 425/453, 454, 451, 4 R, 425/817 R, DIG. 201, 253, 255; 249/126, 120

[56] References Cited

U.S. PATENT DOCUMENTS

| | | | |
|---|---|---|---|
| 1,343,572 | 6/1920 | Lynde | 249/126 |
| 3,521,327 | 7/1970 | Fink et al. | 425/454 |
| 3,999,913 | 12/1976 | Branitzky | 249/126 |
| 4,008,032 | 2/1977 | Pahl | 249/126 |

FOREIGN PATENT DOCUMENTS

WO82/01506  5/1982  PCT Int'l Appl. .............. 425/453

1321397  7/1987  U.S.S.R. .................... 425/453

Primary Examiner—Khanh Nguyen
Attorney, Agent, or Firm—Bacon & Thomas

[57] ABSTRACT

Disclosed is a thermoplastics molding device including two lateral molding chambers separated by a form setting chamber within a casing, a plurality of mold carriers respectively and horizontally supported on horizontal supports in each molding chamber and the form setting chamber at different elevations, reciprocating mechanisms respectively disposed in the molding chambers and the form setting chamber at the bottom and controlled to move the mold carriers in either chamber toward a top stop for permitting the mold carriers with molding dies thereon to be closely attached in a stack; and a shifting mechanism controlled to move molding dies from the mold carriers in either molding chamber to the mold carriers in the form setting chamber for quick setting of the moldings shaped in respective molding dies.

6 Claims, 4 Drawing Sheets

THERMOPLASTICS MOLDING AND FORM SETTING DEVICE

BACKGROUND OF THE INVENTION

The present invention relates to molding devices, and relates more particularly to a thermoplastics molding device for efficiently making moldings out of thermoplastics.

A normal thermoplastics molding device for making moldings out of thermoplastics is generally comprised of two separate equipment, namely, the molding equipment for making moldings out of thermoplastics, and the form setting equipment for setting the moldings thus formed. During the molding process, the thermoplastic is put into respective molding dies, heated to melt, and then compressed air is compressed into each molding die to shape the melted thermoplastic in the respective molding die. When the shape is formed, the molding dies are respectively removed from the molding equipment and then put into the form setting equipment for setting of the moldings thus formed. As the molding dies are made from a heavy and heat conductive metal, it is not easy to move the molding dies from the molding equipment to the form setting equipment. Further, the pipings for delivering compressed air to the molding dies should be maintained connected to the molding dies respectively when the molding dies are being moved from the molding equipment to the form setting equipment, and therefore the moldings in the molding dies can be protected against distortion. This complicated piping system may easily cause an air leakage.

SUMMARY OF THE INVENTION

An object of the present invention is to eliminate the aforesaid disadvantages. Another object of the present invention is to provide a thermoplastics molding and form setting device which combines two molding units and a form setting unit into a compound apparatus for efficiently making moldings out of thermoplastics.

DETAILED DESCRIPTION OF THE PREFERRED EMBODIMENT

Figure 1:
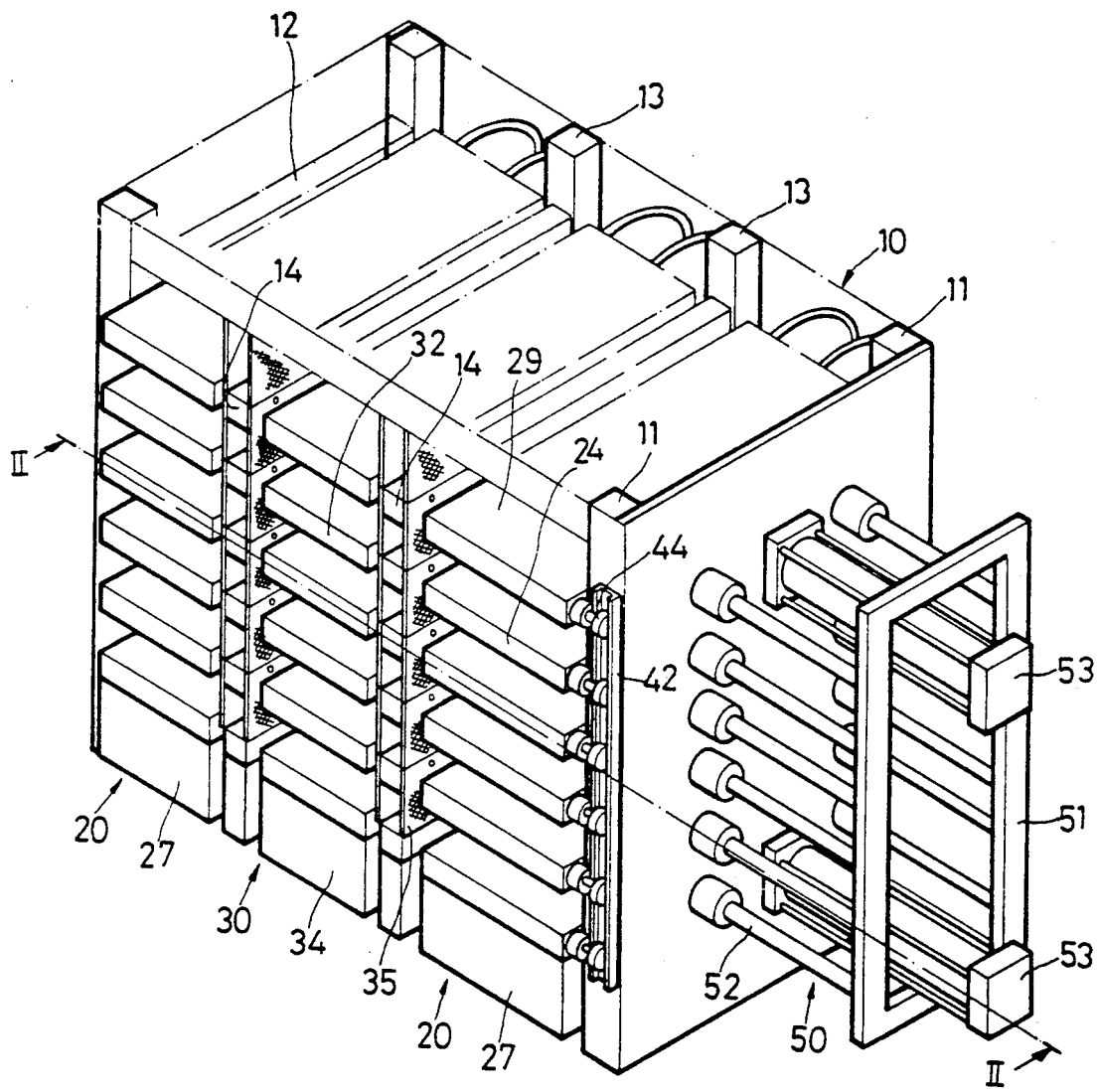
FIG. 1 is a perspective view of a thermoplastics molding device embodying the present invention.

Referring to FIGS. 1,2,3 and 4, a thermoplastics molding device in accordance with the present invention is generally comprised of a casing 10 having two opposite pairs of corner posts 11 at two opposite sides (namely, the front side and the back side) respectively joined by vertically spaced cross bars 12, two intermediate posts 13 spaced at the back side, two rows of forward horizontal suspension arms 14 vertically spaced on the intermediate posts 13 and respectively disposed in parallel with the cross bars 12, two molding units 20 respectively defined between the cross bars 12 and the suspension arms 14, and a form setting unit 30 defined between the two rows of suspension arms 14.

Figures 5, 6, 7:
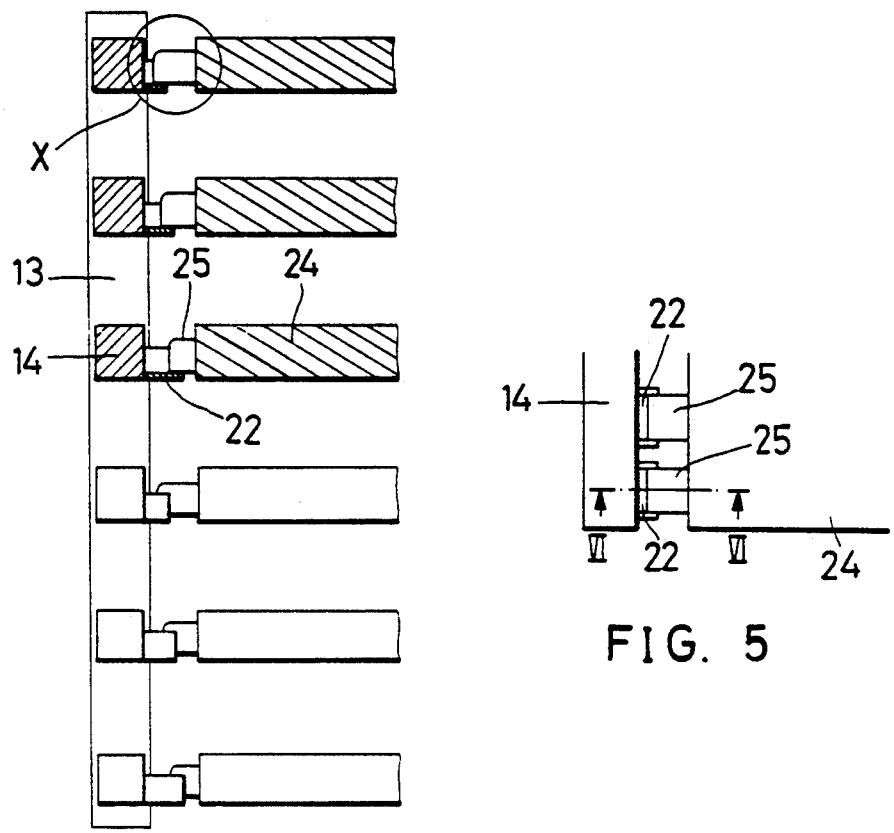
FIG. 5 is a top partial view showing an alternate arrangement of the short horizontal supports.
FIG. 6 is a partial view in cross section taken along line VI—VI of FIG. 5.
FIG. 7 is an enlarged view of the encircled part X of FIG. 6.

Referring to FIG. 7 and FIGS. 1 and 2 again, each molding unit 20 comprises symmetrical pairs of short horizontal supports 22 respectively connected to either cross bar 12 or suspension arm 14 to hold a plurality of mold carriers 24 at different elevations. Each mold carrier 24 has symmetrical pairs of horizontal lugs 25, by which it is supported on corresponding supports 22 between either cross bar 12 and suspension arm 14, and is respectively connected to a heating device (not shown). A molding die 40 is respectively mounted on each mold carrier 24. A hydraulic cylinder 27 is respectively disposed in each molding unit 20 at the bottom, with its piston rod 28 coupled to the bottom mold carrier 24. Before the molding process, the piston rod 28 of the hydraulic cylinder 27 in each molding unit 20 is respectively extended out, to move the mold carriers 24 in the same molding unit 20 upwards one after another and gather them closely in a stack stopped against a top stop plate 29. Therefore, the molding dies 40 in the same molding unit 20 are respectively retained between each two adjacent mold carriers 24. The die cavity of each molding die 40 is respectively connected to an air compressor (not shown) through a respective high pressure air pipe 41. During the molding, each molding die 40 is heated by the heating device to melt the thermoplastics filled therein. As the thermoplastic is melted (this can be done by controlling the heating temperature and time according to the melting point of the thermoplastic being used), a current of compressed air is compressed into each molding die 40 in forcing the molten thermoplastic to fill up the die cavity. After the process of molding, the piston rod 28 is moved back, and thereafter the mold carriers 24 and the molding dies 40 are respectively carried back to their former positions and supported on the respective supports 22.

Figure 2:
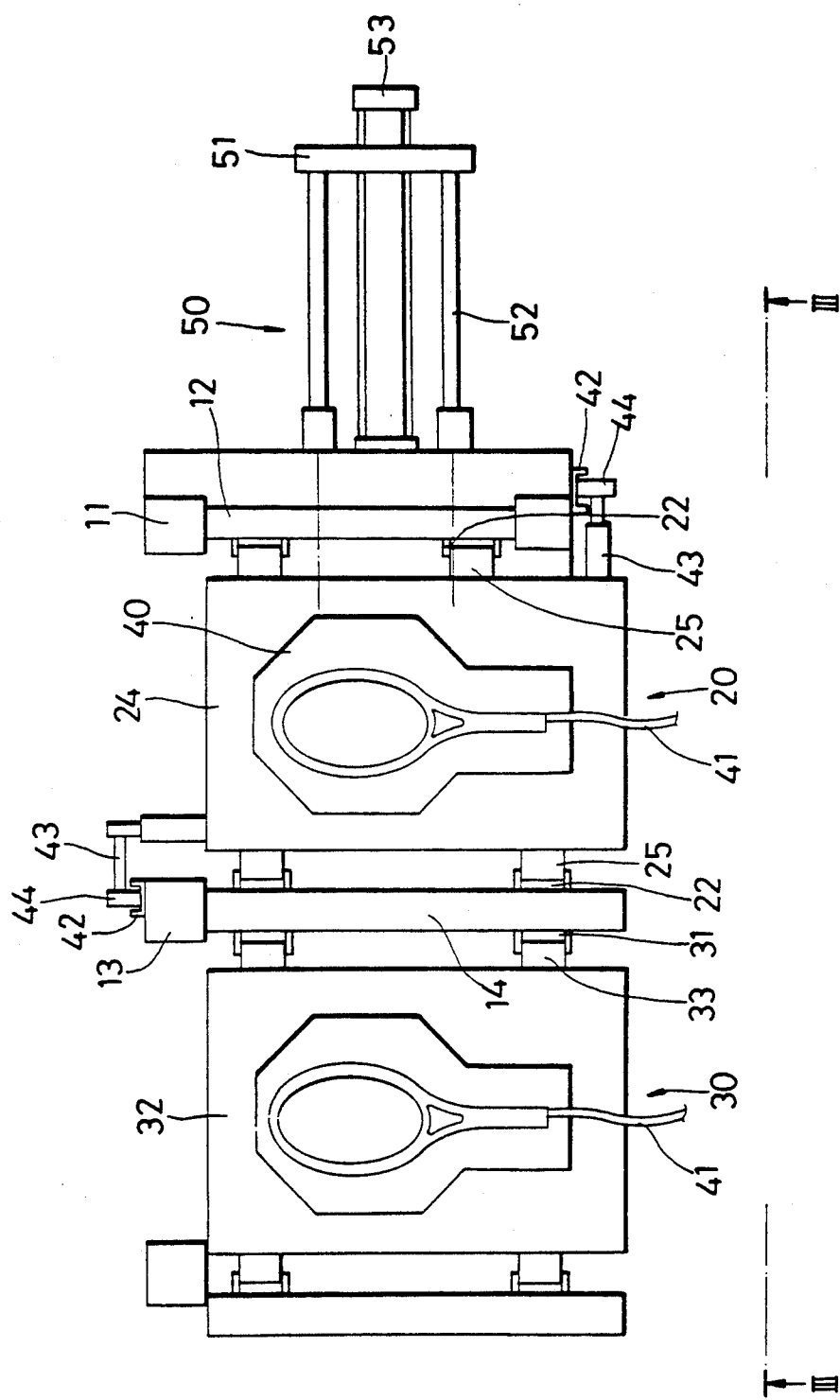
FIG. 2 is a cross section taken along line II—II of FIG. 1.
Figure 3:
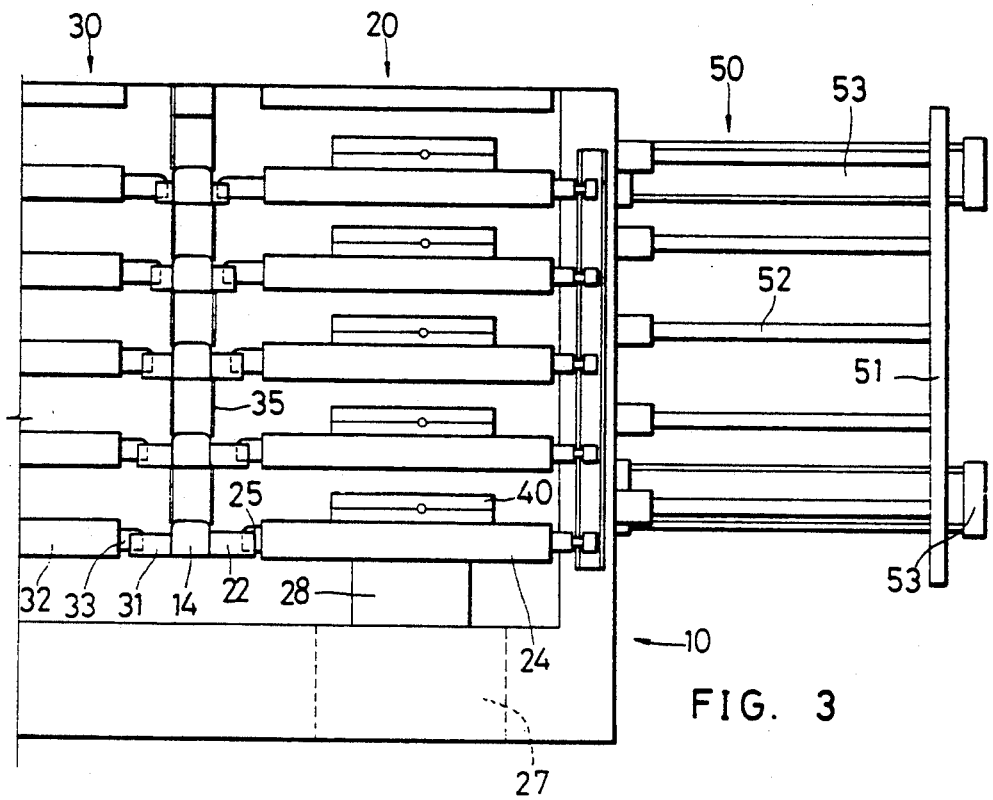
FIG. 3 is a cross section taken along line III—III Of FIG. 2.
Figure 4:
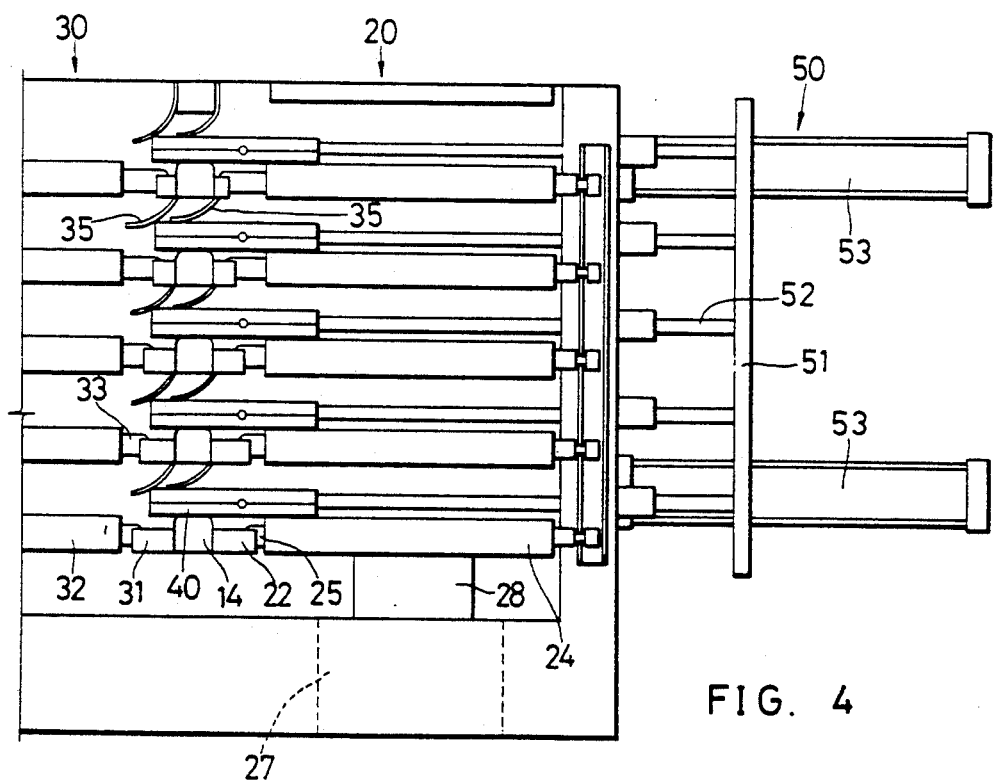
FIG. 4 is a sectional view similar to FIG. 3 but showing the molding dies moved by respective plungers from one molding unit toward the form setting unit.

In order to keep the mold carriers 24 moving on their right course, certain measures must be accomplished. As illustrated in FIG. 2, a vertical channel 42 is respectively made on each corner post 11 and intermediate post 13 for guiding the mold carriers 24. Each mold carrier 24 has two rollers 44 coupled to two extension rods 43 at two diagonal corners thereof and movably inserted in the vertical channel 42 on a corresponding corner post 11 and a corresponding intermediate post 13. The supports 22 are different in length. As illustrated in FIGS. 3 and 4, the length of either support 22 at a higher elevation is relatively shorter than that of another at a lower elevation. By contrast, the length of either lug 25 at a higher elevation is relatively longer than that of another at a lower elevation.

Referring to FIGS. 1,2,3 and 4 again, the form setting unit 30 is disposed between the two molding units 20, and comprised of a plurality of short horizontal supports 31, a plurality of mold carriers 32 with horizontal lugs 33, and a hydraulic cylinder 34. These members are similar to the corresponding members of each molding unit 20. Each mold carrier 32 of the form setting unit 30 is respectively connected to a cooling device (not shown). Heat insulating flaps 35 are suspended between the form setting unit 30 and either molding unit 20 to stop from intercommunication of hot air and cooling air.

After the process of molding, the molding dies 40 are respectively removed from either molding unit 20 and put in the mold carriers 32 in the form setting unit 30, and then the mold carriers 32 are moved upwards and closely gathered in a stack. By means of the operation of the cooling device, the molding dies 40 are quickly cooled down, and therefore the molded items are quickly set.

Shifting the molding dies 40 from either molding unit 20 to the form setting unit 30 is done by means of the operation of a respective molding die shifting device 50. As illustrated in FIGS. 3 and 4, the molding die shifting device 50 comprises a plurality of plunger rods 52 respectively inserted in either molding unit 20, and reciprocated by air cylinders 53 mounted on a frame 51. During the forward stroke of the plunger rod 52, a respective molding die 40 is moved from one mold carrier 24 in one molding unit 20 over a respective suspension arm 14 to a corresponding mold carrier 34 in the form setting unit 30.

Referring to FIGS. 5 and 6, therein illustrates an alternate arrangement of the supports 22. This arrangement greatly reduces the pitch between the suspension arms 14 and the mold carriers 24 or 32.

As indicated, the present invention allows molding dies to be directly moved from either molding unit to the form setting unit for quick setting of the moldings thus formed.

What is claimed is:

1. A thermoplastics molding device comprising:
   a casing having two opposite front posts and two opposite rear posts at four corners thereof, and two intermediate posts spaced between said rear posts;
   two rows of vertically spaced cross bars, each of said rows of said crossbars connecting one of said front post to the respective nearest rear post;
   two rows of forward horizontal suspension arms, each of said rows of said suspension arms connected to a respective one of said intermediate posts at different elevations and disposed in parallel with said vertically spaced cross bars respectively;
   two molding chambers bilaterally defined between each of said rows of said forward horizontal suspension arms and the respective nearest now of said vertically spaced cross bars;
   a form setting chamber defined between said rows of forward horizontal suspension arms;
   short horizontal supports respectively fastened to said cross bars and said suspension arms and bilaterally projected into the molding chambers and the form setting chamber;
   a plurality of mold carriers, each being supported on respective sort horizontal supports in said molding chambers and said form setting chamber at different elevations, each mold carrier having horizontally lugs at two opposite sides releasably supported above the respective horizontal support;
   drive means respectively disposed in said molding chambers and said form setting chamber at the bottom and controlled to move the mold carriers in each of said molding chamber toward a top stop for permitting them to be closely attached to a stack; and
   shifting means controlled to move molding dies from the mold carriers in a selected one of said molding chambers to the mold carriers in said form setting chamber.

2. The thermoplastics molding device of claim 1 wherein each of said mold carriers is coupled with rollers which are movable in a vertical channel formed on one of said posts.

3. The thermoplastics molding device of claim 1 wherein said drive means is a hydraulic cylinder.

4. The thermoplastics molding device of claim 1 wherein said drive means is an air cylinder.

5. The thermoplastics molding device of claim 1 wherein said shifting means comprises plunger rods respectively inserted in each of said molding chambers, and reciprocated by air cylinders mounted on a frame outside said casing.

6. The thermoplastics molding device of claim 1 wherein said form setting chamber is isolated from each of said molding chambers by suspended heat insulating flaps.

* * * * *